United States Patent
Jody et al.

(10) Patent No.: US 6,329,436 B1
(45) Date of Patent: Dec. 11, 2001

(54) PROCESS TO RECYCLE SHREDDER RESIDUE

(75) Inventors: Bassam J. Jody, Chicago; Edward J. Daniels, Oak Lawn; Patrick V. Bonsignore, Channahon, all of IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 07/972,426

(22) Filed: Nov. 5, 1992

(51) Int. Cl.[7] .................................................. C08J 11/04
(52) U.S. Cl. ................................. 521/40; 209/1; 209/2; 209/3; 209/10; 209/36; 209/37; 209/17; 209/173; 209/250; 209/255; 209/273; 209/315; 209/318; 264/37; 264/DIG. 69; 521/42.5; 528/502 R
(58) Field of Search .................. 209/1, 2, 3, 10, 209/36, 37, 17, 315, 318, 173, 273, 250, 255; 264/DIG. 69, 37; 521/42.5, 40; 528/502 R

(56) References Cited

U.S. PATENT DOCUMENTS

| | | | |
|---|---|---|---|
| 4,098,649 | * | 7/1978 | Redker .......................... 264/DIG. 69 |
| 4,728,045 | * | 3/1988 | Tomaszek ............................. 241/19 |
| 5,169,588 | * | 12/1992 | Estepp ........................... 264/DIG. 69 |
| 5,198,471 | * | 3/1993 | Nauman et al. ....................... 264/37 |

* cited by examiner

Primary Examiner—Thurman K. Page
(74) Attorney, Agent, or Firm—Emrich & Dithmar

(57) ABSTRACT

A system and process for recycling shredder residue, in which separating any polyurethane foam materials are first separated. Then separate a fines fraction of less than about ¼ inch leaving a plastics-rich fraction. Thereafter, the plastics rich fraction is sequentially contacted with a series of solvents beginning with one or more of hexane or an alcohol to remove automotive fluids; acetone to remove ABS; one or more of EDC, THF or a ketone having a boiling point of not greater than about 125° C. to remove PVC; and one or more of xylene or toluene to remove polypropylene and polyethylene. The solvents are recovered and recycled.

20 Claims, 2 Drawing Sheets

PROCESS TO RECYCLE SHREDDER RESIDUE

The United States Government has rights in this invention pursuant to Contract No. W-31-109-ENG-38 between the U.S. Department of Energy and The University of Chicago representing Argonne National Laboratory.

BACKGROUND OF THE INVENTION

Each year, the secondary metals industry recovers about $55-60 \times 10^6$ tons of scrap that is used in the production of finished steel products. The single largest source of this scrap is the obsolete automobile. The shredder industry recovers about $10-12 \times 10^6$ tons/yr. of ferrous scrap, most of which is from shredded automobiles. However, for each ton of steel recovered, about 500 lbs. of shredder fluff is produced. Shredder fluff consists of the nonmetallic content of the automobile and other materials (and their constituents), such as air conditioners, refrigerators, dryers, and dishwashers, the latter products are commonly called white goods. At present, shredder fluff is disposed of in landfills; however, the rapidly escalating cost of landfilling, as well as concerns about the fate of this waste in the environment, poses a significant liability to the industry.

Shredder fluff is a very heterogeneous waste material; not only does its composition vary from site to site, but it changes daily even at the same site. Shredder fluff contains plastics [thermoplastics, thermosets, and polyurethane foam (PUF)], rubber, wood, paper, fabrics, glass, sand, dirt, ferrous and nonferrous metal pieces, tar and any other materials that may remain in a vehicle when it is scrapped. Overall, shredder fluff consists of about 50% combustible material and 50% noncombustible (inert) material. The plastics content of shredder fluff is typically about 15–30% by weight. This proportion is expected to increase over the next decade because the use of automotive plastics has increased significantly over the past 10–15 yr. The shredder fluff may also contain brake fluid, gasoline, engine oil, windshield washing fluids, antifreeze (ethylene glycol), FREON™ refrigerants, and in some cases polychlorinated biphenyls (PCBs). PCB contamination can result from the shredding of old white goods that may have intact capacitors. In addition, shredder fluff may contain heavy metals, such as lead, mercury, and cadmium. Shredder fluff also contains varying amounts of moisture, depending on the type of shredding operation (i.e., wet or dry) and if it is exposed to rain while in inventory. An approximate composition of shredder fluff is as follows:

| | |
|---|---|
| Plastics | 15–30% |
| Paper, wood, oils and tar | 15–25% |
| Inert material | 25–75% |
| Moisture | 2–35% |

The composition of the plastics portion of a 1981 model U.S. passenger car was reported (McClellan, T. R., 1983 in Modern Plastics, pp. 50–52, Feb.) to include the following:

| | |
|---|---|
| Polyurethane foam (PUF) | 23% |
| Reinforced plastics (RP), bulk molding compound (BMC), and sheet molding compound (SMC) | 22% |
| Polypropylene (PP) | 19% |
| Polyvinyl chloride (PVC) | 15% |
| Acrylonitrile butadiene styrene (ABS) | 7% |
| Nylons | 4% |
| Other | 10% |

Thermoplastics (such as PP, ABS, and PVC) appear to account for a significant share of the plastics anticipated to be contained in shredder fluff, and the economic recovery of these materials is an aspect of this invention.

The density and shape of shredder fluff is heterogeneous. For example, the PUF, with absorbed moisture and oils, might represent about 10% of the shredder fluff mass but could represent over 50% of its volume. On the other hand, fines (<¼ in.) might represent abut 25% of the mass and only 5% of the volume. The volume ratios of the large and small PUF pieces could be as high as 250:1. The physical variability of shredder fluff is problematic for recyclers and is obviously of significant importance in the development of efficient reclamation technology.

Although a number of alternatives for the disposal, treatment, and recycling of shredder fluff are the subject of ongoing research and development, most are not cost-effective, and none focus on the recovery of thermoplastics from shredder fluff for their reuse as thermoplastics. Even the conversion of shredder fluff to fuels and chemicals is a loss in the potential value of plastics, which are derived from fuels and chemicals in the first place. The concept of recovering plastics from shredder fluff for reuse as plastics is appealing for the following reasons: (1) the plastics content of shredder fluff is expected to increase, (2) the market for plastics use in automobiles is growing, and (3) the plastics recycling industry, although still in its infancy, is growing, and we believe that it will continue to grow.

Thermoset plastics (which cannot be reused as plastics except as fillers in composites) are not soluble in organic solvents, although many thermoplastics are. On the basis of the expected plastics content of shredder fluff presented, we expect that more than 60% of the total thermoplastics content of shredder fluff might be recoverable through the dissolution of the plastics in solvents. Conceptually, because of differences in the solubilities of certain plastics and their differences in susceptibility to specific solvents, the intent of the envisioned basic process concept was to develop a process for extracting specific individual plastics or groups of compatible plastics from shredder fluff using solvents.

SUMMARY OF TIE INVENTION

Accordingly, it is an object of the invention to -segregate shredder fluff or residue into separate components separating and recovering ABS, PVC and polyethylene and polypropylene mixtures.

Another object of the invention is to physically separate polyurethane foam and various metals and metal oxides from the shredder fluff residue prior to selectively dissolving individual plastics or groups of compatible plastics from the shredder fluff.

Another object of the invention is to produce streams of plastics, each of which is in excess of 90% ABS or PVC or a combination of polyethylene or polypropylene.

Another object of the invention is to provide a residual material, which after separation and recovery of the PUF, metals and metal oxides, ABS, PVC, and polyethylene and polypropylene, is a low chlorine, low ash, and low moisture hydrocarbon material that could be used as a chemical feedstock or as a fuel.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
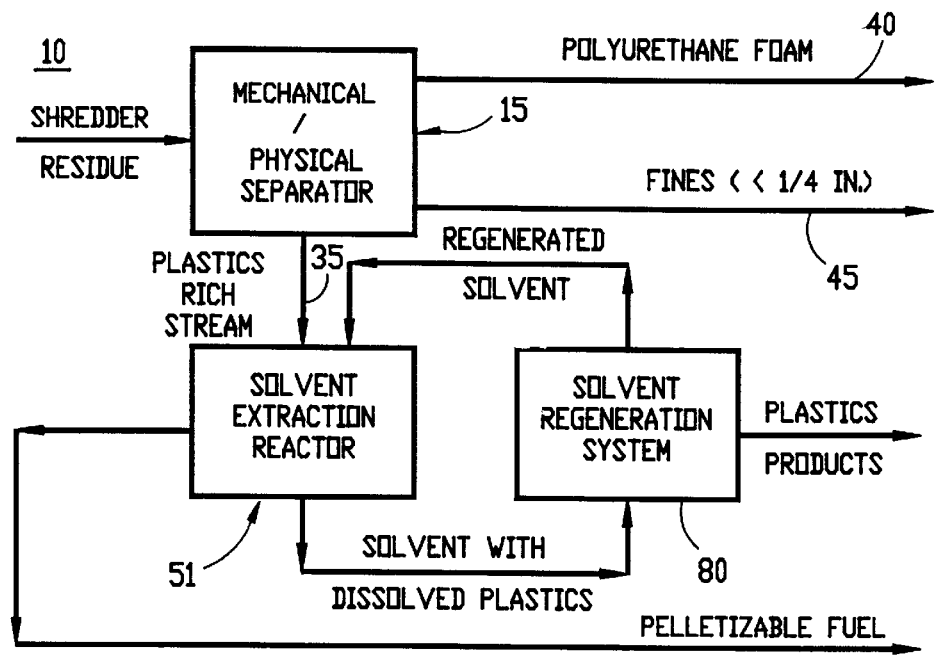
FIG. 1 is a flow diagram in block form of the process and system of the present invention.

Referring now to FIG. 1, there is shown in block form, the process and system of the present invention, in which shredder residue 10 is introduced into a mechanical and physical separator 15 from which is produced at least three streams. A polyurethane foam stream 40 is produced, as will be explained, as is a fines stream 45 and at least one plastics rich stream 35 which is fed to a solvent extraction reactor 51. A solvent regeneration system 80 circulates solvent through the solvent extraction reactor to dissolve the desired plastics from the plastics rich stream 35 after which solvent is removed and the plastic is produced. The material left in the solvent extraction reactor 51 after treatment with a series of solvents can be formulated into a pelletizable fuel, as illustrated, and thereafter burned.

Figure 2:
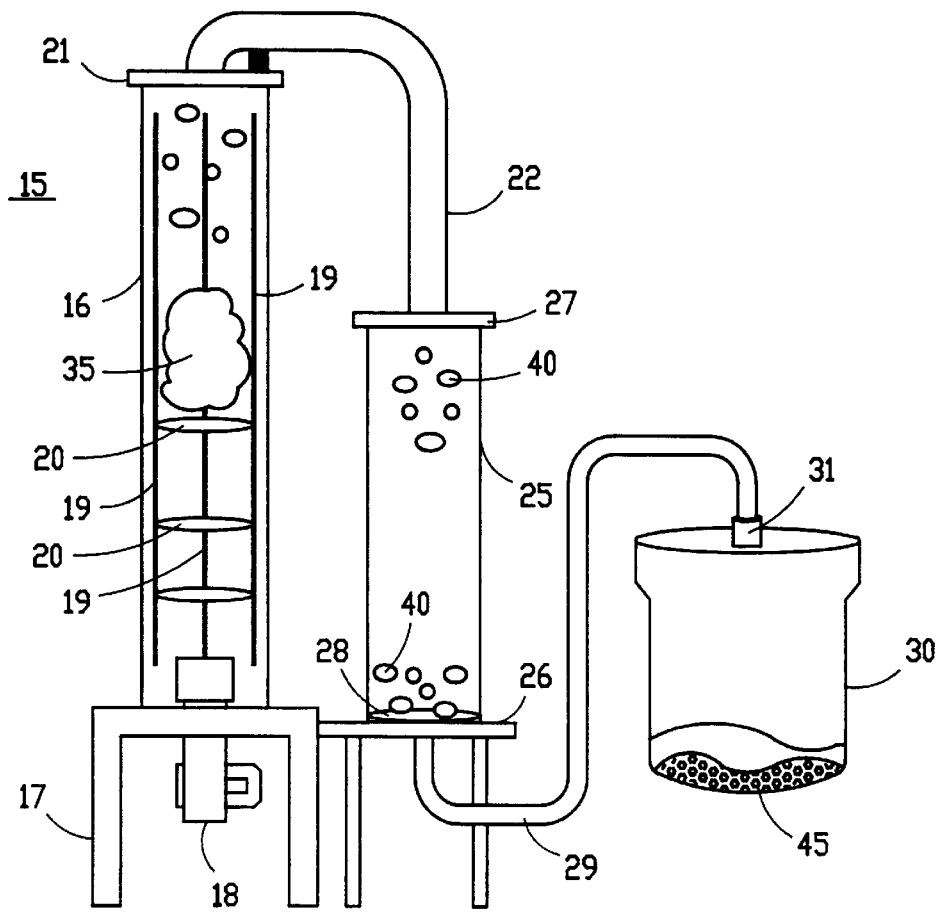
FIG. 2 is a schematic diagram of the system and process for separating polyurethane foam and metals, metal oxides, and non-metal fines from the shredder residue.

Referring to FIG. 2, there is shown a mechanical/physical separator 15 including a column 16 resting on a base 17 which supports a blower motor 18 capable of forcing air upwards through the column 16 continuously or intermittently, as will be explained. A plurality of vertically extending support rods 19 hold a plurality of vertically spaced apart and horizontally disposed screens 20. The screens 20 may be of various mesh sizes to permit a variety of materials to fall to the bottom for removal through the bottom, other materials to be blown through the top plate 21 which covers the column 16 and serves as a connection for a hose 22 which leads to a spaced column 25 supported by a stand or base 26. The column 25 has a top plate 27 which has a suitable connection therein for the hose 22 and a bottom screen 28 which covers a hose 29 which provides communication between the column 25 and a vacuum chamber 30 by means of a fitting 31. Means for establishing a vacuum in the system just described and illustrated in FIG. 2 is provided but is not shown. Dust and fines from the shredder residue 35 is indicated by the reference numeral 45 and may end up in the vacuum chamber 30, while polyurethane foam 40 remains in the column 25 and what is left of the shredder residue 35 remains in the column 16. Some fines may exit column 16 through a bottom port (not shown).

By selection of the appropriate screens, it is possible not only to remove the polyurethane foam but also fines having effective diameters of less than about ¼ inch. Screens 20 used in column 16 range from $\frac{1}{16}$ inch to about 1.5 inch in combination with the unit just described and a vacuum system was used to separate the shredder residue into three fractions, a polyurethane foam fraction 40 (hereinafter PUF), a plastics rich stream 35 and the fines 45 by using a ¼ inch screen with the screened overhead space connected to the vacuum chamber 30. The use of multiple screens provides for separation of the material into more than one plastics-rich fraction. The apparatus just described operates in a batch mode, but is readily extended to a continuous physical separation process.

The PUF fraction 40 which absorbed oils and moisture, represented about 10% of the shredder fluff mass and over 30% of its volume, it being understood that shredder residue is not uniform and each batch may be different and each portion of each batch may be different. The hereinafter set forth examples are for purposes of illustration only and do not limit the scope of the invention. The recovered PUF material 40 may be treated with a mild solvent such as acetone or hexane to extract and recover any absorbed automotive fluids such as gasoline, brake fluid, engine and oils, windshield washing fluids, antifreeze, refrigerants or PCB's, and thereafter washed in a water detergent solution to remove dirt which has been absorbed or which has adhered to the PUF material. Treatment with a mild solvent and washing reduced the weight of the recovered dirty PUF by about 35%. Cleaned PUF material 40 may be acceptable as a raw material for carpet padding.

The fines fraction represented about 20% of the shredder fluff mass. A magnet may be used further to separate a fines fraction which is found to contain 30–40% by weight magnetic material. The magnetic fraction was analyzed and found to contain about 64% iron, about ½% zinc, about ¼% copper, about $\frac{1}{10}$% lead, about 0.7% chromium, about $\frac{3}{100}$ths % aluminum with the residual essentially oxygen. The non-magnetic fraction of the fines contained sand, glass, gravel and some non-magnetic metallic material.

Figure 3:
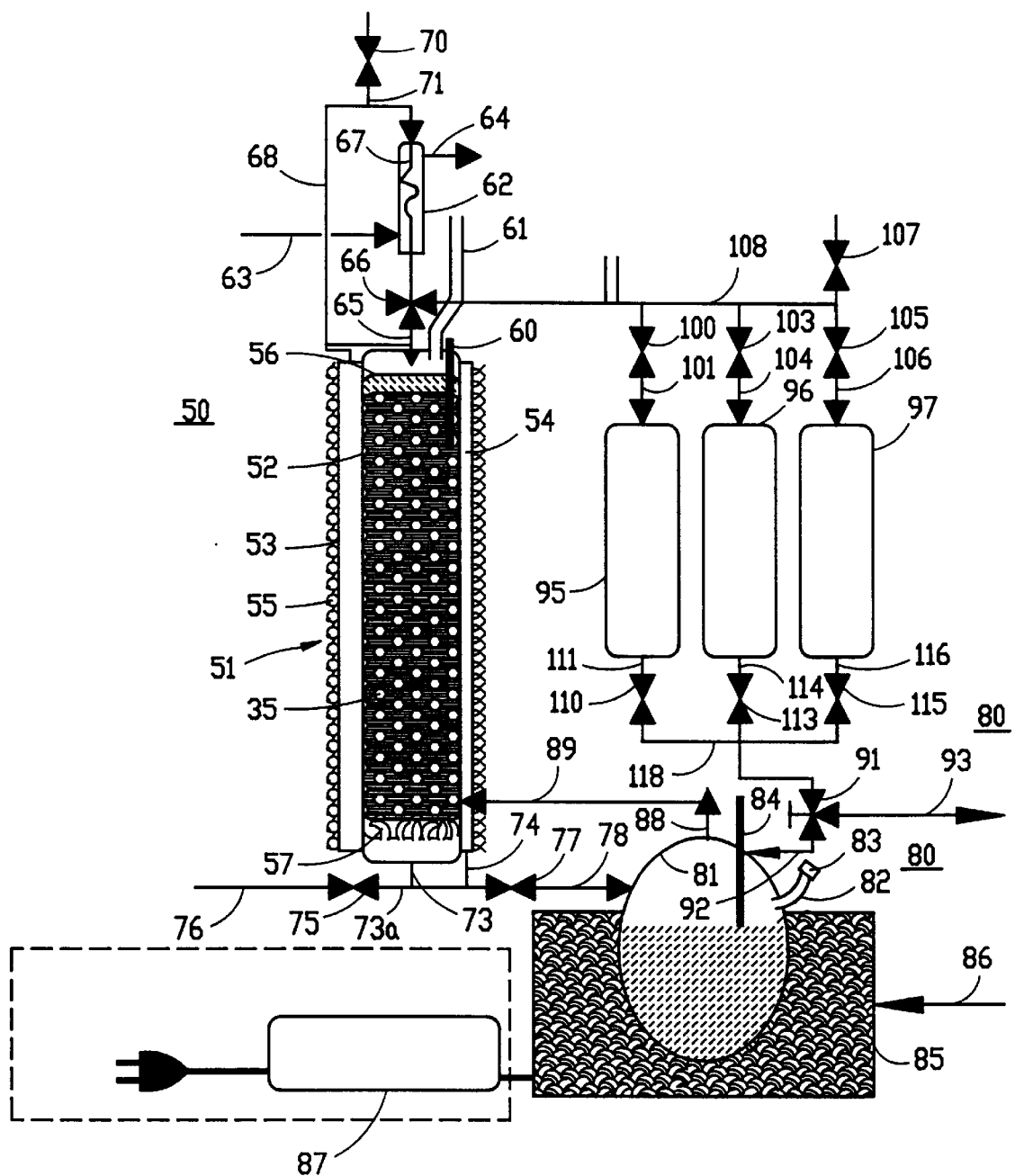
FIG. 3 is a schematic flow diagram of a system and process for accomplishing the objects of the present invention showing the combination system of solvent extraction and solvent regeneration useful in the present invention.

Referring now to FIG. 3, there is shown a plastic extraction system 50 which includes a extraction column 51 comprised of an inner cylindrical reactor 52 and an outer cylinder 53 defining an annulus 54 therebetween. Insulation such as glass wool surrounds the outer cylinder 53. The extraction column 51 has a distribution plate 56 at the top thereof and a screen 57 at the bottom thereof.

A thermometer or thermocouple 60 is positioned at the top of the reactor 52 and may be connected to a variety of recording mechanisms, not shown, as is well known in the art. A vent line 61 extends from the top of the extraction column 51 and particularly the inner cylindrical reactor 52, for a purpose hereinafter set forth, and may be connected to a scrubber or other clean-up device, not shown. The purpose of the vent line is to prevent accidental pressure build-up in the reactor. Neither the process nor the reactor are intended for pressurized operation.

A condenser 62 is schematically shown and is provided with an inlet line 63 for cooling water and an outlet line 64 for the water which is slightly warmer after solvent vapors have travelled through the condenser and have condensed from the gas to the liquid giving up heat to the cooling water, as is normal in the art and well understood. The condenser 62 is in fluid communication with the top of the inner cylindrical reactor 52 by means of a line 65 extending from the reactor 52 to a multi-way valve 66 and a line 67 interconnecting the condenser 62 with the valve 66. An inlet line 68 serves to connect the top of the annulus 54 formed between the inner and outer cylinders 52, 53 and the condenser 62, there being provided a pressure release valve 70 and connecting line 71 in line 68 before same is introduced into the condenser 62 to provide means for preventing pressure build-up in the system.

When the extraction process is completed, the multi-way valve 66 is positioned to allow the removal of solvent and solvent vapors from the inner cylinder reactor 52 and to remove solvent from the shredder residue in the inner cylinder reactor 52. When so positioned solvent vapors rise from the inner cylindrical reactor 52 through the multi-way valve 66. The vapors are directed to the condenser 62 by connecting line 65a. The position of the multi-way valve 66 then allows the condensed vapors to be directed to the solvent storage tanks 95, 96, 97. This enables drying of the material inside the reactor thereby without having to transfer the material out of the reactor. This procedure maximizes the recovery of solvent and minimizes the chance of fugitive solvent emissions.

The bottom of inner cylinder 52 is connected via a line 73 to a manifold line 73a which is also connected via a line 74 to the bottom of the annulus 54 formed between the inner and outer cylinders 52, 53. A valve 75 on one end of the manifold line 73a connects a sampling port or line 76 and a valve 77 connects the manifold line 73a via line 78 to a solvent regeneration system 80.

The solvent regeneration system 80 includes a solvent container 81 having a loading port 82 and a cap 83 for sealing same. A thermometer 84 is positioned within the solvent container 81 and extends outwardly thereof and may be connected to suitable recording mechanism, not shown.

A heating mechanism 85 is provided for the solvent container 81 and includes an inlet port 86 for the heating medium and a temperature controller 87 for varying the temperature of the heating mechanism 85.

The solvent container 81 has a vapor outlet line 88 which turns into a vapor inlet feed 89 to the bottom of the annulus 54 between the inner cylinder reactor 52 and the outer cylinder 53. A valve 91 is connected to the solvent container 81 via a line 92 and to an outlet line 93. The multi-way valve 91 is also connected to a plurality of solvent storage tanks 95, 96, and 97. The multi-way valve 91 can direct the flow of solvents from the plurality of storage tanks 95, 96, 97 to the solvent reservoir 81, or can direct the flow of solvents from the plurality of storage tanks 95, 96, 97 through connect line 93 to drain the system when necessary.

Each of the solvent storage tanks 95–97 is provided with valving arrangements which are substantially the same and it should be understood that although the present system is illustrated with three such solvent storage tanks is within the skill of the art to add more should it be desired to accommodate plastics in automobile shredder fluffs which are not now presently in large enough quantities to be economically recoverable or to accommodate a change in the make-up of the plastics used in automobiles in the future.

The solvent storage tank 95 is provided at the top thereof with a valve 100 connected to the tank 95 via a line 111; the storage tank 96 is provided at the top thereof with a valve 103 connected thereto via a line 104; and storage tank 97 is provided with a valve 105 at the top thereof connected thereto via a line 106. A vent 107 to prevent pressure build-up is positioned in a manifold line 108 which connects each of the three solvent tanks 95–97 to the valve 66 in the line connecting the condenser 62 to the top of the inner cylindrical reactor 52. Similarly, each of the solvent storage tanks 95–97 is provided with a valve at the bottom thereof. Valve 110 is connected via a line 111 to the solvent tank 95; a valve 113 is connected via a line 114 to the bottom of the solvent storage tank 96; and valve 115 is connected via a line 116 to the bottom of solvent storage tank 97. Each of the valves 110, 113 and 115 is connected to a manifold line 118 which is connected at the other end thereof to the valve 91 which is also connected to the line 92 and the line 93. The line 92 leads to the solvent container 81.

In order to recover separate streams which are over 90% ABS, PVC and a combination of polypropylene and polyethylene, it is preferred to contact the automobile shredder residue 35 which is transported to the inner cylindrical column 52 after the mechanical/physical separation hereinbefore described with a variety of solvents, sequentially brought into contact with the shredder residue 35. It is preferred to remove sequentially first any ABS present then any PVC present and finally polypropylene and polyethylene. The shredder residue initially may be washed in the inner cylindrical reactor 52 with either an alcohol such as methanol or ethanol or hexane, hexane being preferred. This treatment removes oils and dirt. The ABS may be selectively dissolved from, the plastics rich shredder residue by contacting same with a ketone such as acetone. The PVC may be dissolved from the remaining plastics rich stream,by contacting same with ethylene dichloride or THF or methyl isobutyl ketone and either xylene or toluene may be used to remove the polypropylene and/or polyethylene from the remaining plastics rich stream, xylene being preferred.

Referring to FIG. 3, operation of the system 50 will be explained. After the shredder residue or fluff has been mechanically separated to recover the PUF and the fines, the remainder of the material which is rich in plastics is deposited in the reactor 52 and is noted as material 35. One of the solvents in the storage tanks 95, 96, and 97 is thereafter emptied into the container 81. For instance, if the solvent to be used is one of the ketones such as acetone and is stored in container 95, then the valve 110 and the valve 91 are positioned to drain liquid acetone from the storage tank 95 into the tank 81. After the liquid is positioned in the tank 81, the valve 91 and 110 is closed to prevent any backflow of vapor through the system. Thereafter, the heat temperature control unit 87 is actuated to raise the temperature of the heating mechanism 85 to vaporize the acetone in the container 81 which flows through lines 88, 89 into the annulus 54 and then upwardly into the condenser 62.

By virtue of the cooling water which flows through the inlet 63 and outlet 64, the solvent vapor is condensed and then flows downwardly through lines 67, valve 66 and line 65 into the top of the vessel 52 as a liquid and is distributed by the distributor plate 56 over the fluff 35 which is in the reactor 52. Liquid flows through the fluff and out through line 73 into manifold line 73a through the valve 77, line 78 back into the solvent container 81. Any solvent which condenses from the annulus 54 is transmitted via a line 74 to the manifold line 73a. This procedure is repeated, that is after the solvent has passed through the material 35 picking up ABS (if the solvent is acetone), and thereafter the solvent in container 81 can be reheated and vaporized, via lines 88, 89 as vapor into the annulus 54 for transmittal through the condenser 62 and back into the reactor 52 as often as required until the solvent has leached out a sufficient amount of ABS. In order to recover the ABS from the acetone solvent, water may be added to the acetone causing the ABS to drop out of solution. Thereafter, a separation can be effected and the acetone can be returned to the storage tank 95 by vaporizing the acetone, condensing same and returning it to the solvent storage facility 95 by means of adjustment of the valve 66 and the valve 100. This design allows for the minimum inventory of solvents in the system.

After the acetone has been removed completely from the system as previously described, a solvent for the removal of PVC can be introduced from the solvent storage tank 96. Such a solvent can be any of EDC, THF or methyl isobutyl ketone and each is capable of selecting PVC from the shredder fluff 35 remaining in the reactor 52. The procedure consists of bringing EDC, THF or methyl isobutyl ketone into contact with the fluff 35 in the same way as previously described and separation of the dissolved PVC from solution is done by boiling off the solvent leaving a concentrated solution of PVC to be removed from solvent container 81.

Similarly, polypropylene and polyethylene are extracted by using either toluene or xylene as the solvents, xylene being preferred. In the case of xylene after contact with the shredder fluff 35 in the manner described, if the xylene is cooled below its boiling point of about 138° C., the polypropylene and polyethylene separate out thereby effecting separation of the desired plastic from the solvent.

The system 50 described herein has some advantages which make it safe but which are not absolutely necessary for the process of the invention. For instance, by separating the heating elements from the solvent, fire is avoided if the solvent container 81 breaks. The storage tanks 95–97 are valved so as to permit the solvent storage therein always to be maintained separate and when the solvent is run into the container 81, the identity of the solvent can be ascertained quickly by measuring the boiling point with the thermometer 84. Moreover, by boiling the solvent through the system and discarding any small residue which remains, solvent can always be purified to accommodate any slight contamination which might occur through the use of common manifolding such as lines 118 and 108. Vents 61 and 107 along with the pressure release valve 70 cooperate to ensure that hazardous pressure does not build-up within the system.

In general, PVC can be selectively dissolved by use of EDC, THF or a ketone having a boiling point not greater than about 125° C., methyl isobutyl ketone having a boiling point of about 118° C. being an example, as is methyl ethyl ketone. However, use of a higher boiling point ketone, such as cyclohexanone (b.p. 156° C.) will dissolve PVC and polyethylene and polypropylene. The polyethylene and polypropylene can be separated by cooling the cyclohexanone while the PVC will remain in solution.

In general, there has been provided a system and process for recovering at least five different materials from automobile shredder fluff. Polyurethane foam materials have been recovered as have metallic fines of less than about ¼ inch. The plastics rich fraction has been separated into a ABS stream, a PVC stream and a polypropylene and/or polyethylene stream. The remaining material after the plastics have been removed can be pelletized and used as fuel, the entire system treating automobile shredded residue in a manner to improve the environment, provide useful products therefrom and reduce the amount of material being transported to landfill.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process operating at substantially atmospheric pressure for recycling shredder residue, comprising mechanically separating any polyurethane foam materials present, separating a fines fraction of less than about ¼ inch leaving a plastics-rich fraction, sequentially contacting the plastics rich fraction with a series of solvents beginning with one or more of hexane or an alcohol to remove automotive fluids; a acetone to remove ABS; one or more of EDC, THF or a ketone having a boiling point not greater than about 125° C. to remove PVC; and one or more of xylene or toluene to remove polypropylene and polyethylene, recovering and recycling the solvents, thereby producing streams rich in ABS, PVC and one or more of polypropylene and polyethylene.

2. The process of claim 1, and further including contacting the polyurethane foam material with hexane or an alcohol to remove any automotive fluids including one or more of gasoline, brake fluid, engine oil, transmission oil, windshield washing fluids, antifreeze, refrigerants and PCBS.

3. The process of claim 1, wherein the fines include one or more of rubber, wood, paper, fabrics, glass, sand, dirt, ferrous and non-ferrous metals, and tar.

4. The process of claim 1, wherein the shredder residue includes plastics present in the range of from about 15% to about 30% by weight, paper, wood and tar present in the range of from about 15% to about 25% by weight, inert material present in the range of from about 25% to about 75% by weight, and moisture present in the range of from about 2% to about 35% by weight.

5. The process of claim 4, wherein the plastics rich fraction includes greater than 20% by weight thermoset plastics, almost 20% by weight polyethylene and polypropylene, about 15% by weight PVC, and less than about 10% by weight ABS.

6. The process of claim 1, wherein the plastics rich fraction is contacted with hexane to remove automotive fluids.

7. The process of claim 6, wherein the plastics rich fraction is contacted with EDC to remove PVC.

8. The process of claim 6, wherein the plastics rich fraction is contacted with THF to remove PVC.

9. The process of claim 6, wherein the plastics rich fraction is contacted with methyl isobutyl ketone to remove PVC.

10. The process of claim 6, wherein the plastics rich fraction is contacted with methyl ethyl ketone to remove PVC.

11. The process of claim 1, wherein the plastics rich fraction is contacted with xylene to remove polypropylene and/or polyethylene.

12. The process of claim 6, wherein water is added to the solution of ABS and acetone to separate the ABS from the acetone.

13. The process of claim 11, wherein the xylene is contacted with the plastics fraction is near the boiling point of xylene to dissolve the polypropylene and polyethylene present in the plastics rich stream and thereafter the solution of xylene and polypropylene and/or polyethylene is cooled to separate the plastic from the xylene.

14. A system for recycling shredder residue, comprising means for separating any polyurethane foam materials present, means for separating a fines fraction of less than about ¼ inch leaving a plastics-rich fraction, means for sequentially contacting the plastics rich fraction with a series of solvents beginning with one or more of hexane or an alcohol to remove automotive fluids; an acetone to remove ABS; one or more of EDC, THF our a ketone having a boiling point not greater than about 125° C. to remove PVC; and one or more of xylene or toluene to remove polypropylene and polyethylene, and means for recovering and recycling the solvents, thereby producing streams rich in ABS, PVC and one or more of polypropylene and polyethylene.

15. The system of claim 14, wherein said means for separating any polyurethane foam materials present in the recycling shredder residue comprises a classification unit having screen means, blower means and vacuum means for separating lighter polyurethane materials from the remaining shredder residue and conduit means connected to said classification means for transporting the separated polyurethane to another vessel.

16. The system of claim 15, wherein said classification unit has one or more screens near the bottom thereof for separating the shredder residue from material passing through said one or more screens near the classification bottom to separate fine material from the remaining shredder residue.

17. The system of claim 16, wherein said means for sequentially contacting the plastics rich stream with a series of solvents includes a double walled reaction vessel in fluid communication with a source of solvent vapor and a condenser for condensing the solvent vapor to a liquid for introduction into said double walled reaction vessel.

18. The system of claim 14, wherein a plurality of solvent sources are connected to said double walled reaction vessel holding the plastics-rich fraction and to a solvent recovery mechanism, whereby the solvents are sequentially brought in contact with the plastics-rich fraction and thereafter transported to said solvent recovery mechanism for separating the solvent from any plastic material dissolved therein.

19. The system of claim 18, wherein the solvent sources are connected in parallel to said double walled reaction vessel holding the plastics and rich fraction.

20. The system of claim 19, wherein said means for recovering and recycling solvents include heating and cooling means for vaporizing the solvent to separate any plastics fraction dissolved therein and cooling means for condensing the vaporized solvent to liquid.

* * * * *

UNITED STATES PATENT AND TRADEMARK OFFICE
CERTIFICATE OF CORRECTION

PATENT NO.    : 6,329,436 B1
DATED         : December 11, 2001
INVENTOR(S)   : Bassam J. Jody, Edward J. Daniels and Patrick V. Bonsignore It is certified that error appears in the above-identified patent and that said Letters Patent is hereby corrected as shown below:

Column 2,
Line 48, delete "TIE" and insert -- THE --
Line 49, delete the hyphen "-" before the word "segregate"

Column 9,
Line 2, delete "our" and insert -- or --

Signed and Sealed this

Seventh Day of May, 2002

Attest:

JAMES E. ROGAN
Attesting Officer — Director of the United States Patent and Trademark Office